United States Patent
Kang et al.

(10) Patent No.: US 7,432,663 B2
(45) Date of Patent: Oct. 7, 2008

(54) CIRCUIT FOR IGNITING A HIGH INTENSITY DISCHARGE LAMP

(75) Inventors: Young G. Kang, Vernon Hills, IL (US); Mustansir H. Kheraluwala, Lake Zurich, IL (US); Sivakumar Thangavelu, Round Lake, IL (US); Markus Ziegler, Schaumburg, IL (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 11/534,926

(22) Filed: Sep. 25, 2006

(65) Prior Publication Data

US 2008/0074054 A1    Mar. 27, 2008

(51) Int. Cl.
*H05B 37/02* (2006.01)

(52) U.S. Cl. .............................. 315/209 R; 315/209 T; 315/246

(58) Field of Classification Search ............. 315/209 R, 315/209 CD, 219, 224–226, 244, 276, 289–291, 315/209 T, 212, 246–247
See application file for complete search history.

(56) References Cited

U.S. PATENT DOCUMENTS

| | | | | |
|---|---|---|---|---|
| 4,958,207 A | 9/1990 | Suni et al. | | 357/24 |
| 5,691,605 A | 11/1997 | Xia et al. | | 315/307 |
| 5,831,394 A * | 11/1998 | Huber et al. | | 315/224 |
| 6,008,591 A | 12/1999 | Huber et al. | | 315/219 |
| 6,362,576 B1 | 3/2002 | Huber et al. | | 315/289 |
| 7,145,293 B2 | 12/2006 | Braun et al. | | 315/224 |
| 7,239,090 B2 * | 7/2007 | Okamoto et al. | | 315/219 |
| 7,291,983 B2 * | 11/2007 | Hu et al. | | 315/209 CD |
| 7,301,289 B2 * | 11/2007 | Okamoto et al. | | 315/291 |
| 7,332,868 B2 * | 2/2008 | Okamoto et al. | | 315/209 R |
| 2002/0167056 A1 * | 11/2002 | Sakamoto | | 257/368 |
| 2004/0263091 A1 * | 12/2004 | Deurloo et al. | | 315/246 |
| 2006/0071611 A1 * | 4/2006 | Van Casteren | | 315/225 |
| 2006/0097652 A1 * | 5/2006 | Van Casteren et al. | | 315/209 R |
| 2007/0007902 A1 * | 1/2007 | Lu | | 315/209 R |
| 2007/0145905 A1 * | 6/2007 | Van Der Voort | | 315/209 CD |
| 2007/0285030 A1 * | 12/2007 | Okamoto et al. | | 315/247 |

* cited by examiner

*Primary Examiner*—Thuy Vinh Tran
*Assistant Examiner*—Tung X Le
(74) *Attorney, Agent, or Firm*—Carlo S. Bessone

(57) ABSTRACT

A circuit (300) for igniting a high intensity discharge (HID) lamp comprises input terminals (302,304), output terminal (306,308), a charging circuit ($R_{IGN}$, $C_{IGN}$), a transformer (320) having a primary winding (322) and a secondary winding (324), a MOSFET (340), and a clamping diode ($D_{CLAMP}$). During operation, ignitor circuit (300) provides a high voltage ($V_{IGN}$) for igniting an HID lamp. Ignitor circuit (300) provides an ignition voltage ($V_{IGN}$) having a peak magnitude that is more predictable and less prone to degradation due to the influences of parasitic components. Additionally, ignitor circuit (300) may be realized in a manner that is significantly more cost-effective than comparable prior art circuits.

18 Claims, 3 Drawing Sheets

CIRCUIT FOR IGNITING A HIGH INTENSITY DISCHARGE LAMP

FIELD OF THE INVENTION

The present invention relates to the general subject of circuits for powering discharge lamps. More particularly, the present invention relates to a circuit for igniting a high intensity discharge (HID) lamp.

RELATED APPLICATIONS

The subject matter of the present application is related to that of U.S. Pat. No. 6,008,591 (issued to Huber et al. on Dec. 28, 1999, and titled "Circuit for Starting an HID Lamp") and U.S. Pat. No. 6,362,576 B1 (issued to Huber et al. on Mar. 26, 2002, and titled "Circuit Arrangement for Igniting a Lamp"), the disclosures of which are incorporated herein by reference.

BACKGROUND OF THE INVENTION

The requirement of a high starting voltage is a well-known characteristic of discharge lamps. Some types of discharge lamps, such as high-intensity discharge (HID) lamps, require starting voltages on the order of several thousand volts.

The prior art teaches a number of starting circuits for HID lamps. Many prior art starting circuits employ a pulse coil to generate a narrow high voltage pulse for igniting the lamp. Typically, the pulse coil is located in series with the lamp and must therefore be capable of handling the current that flows through the lamp after the lamp ignites. Because the lamp operating current is typically quite large (e.g., 1 ampere or more in the case of a 100 watt M98 type lamp), the pulse coil must be wound with fairly large diameter wire in order to keep resistive power losses within a manageable limit and thereby preserve the energy efficiency of the associated ballast. Consequently, the pulse coil may have considerable physical size and monetary cost.

"Pulse" type starting circuits typically require breakdown devices such as sidacs. Such devices add significant cost and/or complexity to the starting circuit, and may significantly detract from the overall reliability of the associated ballast. Moreover, "pulse" type starting circuits are usually ill-suited for use with remote installations in which the length of the wires between the lamp and ballast is more than a few feet. Due to the inherent capacitance of the wiring, the high frequency starting pulse may be significantly attenuated. Consequently, the lamp may not receive sufficient voltage to ignite.

The prior art also includes a number of alternative approaches for igniting an HID lamp. Examples of such circuits are disclosed in U.S. Pat. No. 6,008,591 (Huber et al.) and U.S. Pat. No. 6,362,576 B1 (Huber et al.), both of which disclose ignitor circuits which appear to represent a considerable advance over the prior art.

FIG. 1 describes an ignitor circuit 100 like that which is disclosed in U.S. Pat. No. 6,008,591. During operation of ignitor circuit 100, $C_{IGN}$ charges up from an alternating current (AC) voltage, $V_{AC}$, (provided between input terminals 102,104) via D1 and $R_{IGN}$. When the ignition switch [i.e., transistor $Q_{IGN}$, which is realized by an insulated-gate bipolar transistor (IGBT)] is turned on by an appropriate control signal $V_G$, the stored energy in $C_{IGN}$ is discharged through the primary winding 122 of transformer 120, thereby inducing a voltage across primary winding 122. The induced voltage across primary winding 122 correspondingly induces a voltage across secondary winding 124, which provides a high voltage, $V_{IGN}$, (between output terminals 116,118) for igniting the lamp. The desired amplitude for the ignition voltage, $V_{IGN}$, is obtained by selecting an appropriate turns ratio for the primary and secondary windings 122,124 of transformer 120.

A drawback of ignitor circuit 100 is that it does not provide a positive current path if/when transistor $Q_{IGN}$ is turned off before the current through transistor $Q_{IGN}$ (i.e., the current that flows from the collector to the emitter when $Q_{IGN}$ is turned on) falls to zero. Consequently, ignitor circuit 100 requires that the control signal $V_G$ be removed (i.e., set at a value—e.g., zero volts—that is insufficient to activate transistor $Q_{IGN}$) when anti-parallel diode $D_A$ is conducting, which tends to increase the complexity and cost of providing a suitable control signal, $V_G$.

Another drawback of ignitor circuit 100 is that the peak current that flows through transistor $Q_{IGN}$ is relatively high (e.g., 30 to 40 amperes). During operation of ignitor circuit 100, the leakage inductance of primary winding 122 acts to limit the amplitude of the discharge current (from the stored energy in $C_{IGN}$) that flows when transistor $Q_{IGN}$ is on. Unfortunately, in ignitor circuit 100, the leakage inductance of primary winding 122 is quite low in value, which has the effect of allowing the discharge current to have a relatively high peak amplitude (e.g., 30 to 40 amperes). Consequently, in implementing ignitor circuit 100, transistor $Q_{IGN}$ must be realized by an IGBT having a high peak current rating; that, of course, tends to increase the material cost of implementing ignitor circuit 100.

FIG. 2 describes an ignitor circuit 200 that is a modified version of ignitor circuit 100 (described in FIG. 1). Ignitor circuit 200 includes a pair of DC input terminals 202,204 for receiving a substantially direct current (DC) rail voltage, $V_{RAIL}$, a pair of AC input terminals 206,208 for receiving an alternating current (AC) voltage, $V_{AC}$, and a pair of output terminals 216,218 across which is provided an ignition voltage, $V_{IGN}$. In comparison with ignitor circuit 100, ignitor circuit 200 includes one additional component—an inductor $L_{IGN}$. During operation of ignitor circuit 200, inductor $L_{IGN}$ serves to limit the rate of rise of the current that flows through ignition switch $Q_{IGN}$; clamping diode $D_{CLAMP}$ provides a current path when $Q_{IGN}$ is turned off.

During operation, ignitor circuit 200 provides an ignition voltage, $V_{IGN}$, for which the amplitude of the positive peak is generally higher than the amplitude of the negative peak (which is much less than 3 kilovolts); it has been observed, however, that the amplitude of the positive peak is sometimes significantly reduced and actually lower than the amplitude of the negative peak, such that the amplitudes of the positive peak and the negative peak are both less than 3 kilovolts. It is believed that this reduction in the amplitude of the positive peak of $V_{IGN}$ is attributable to the influence of parasitic components, such as the leakage inductance and the coupling capacitance of transformer 220 (of which the leakage inductance is prominent).

In practice, in order to provide a sufficiently high peak value for $V_{IGN}$, ignitor circuit 200 requires a relatively high turns ratio between the secondary and primary windings 224, 222 of transformer 220; for example, it has been contemplated that, for a DC rail voltage ($V_{RAIL}$) of about 460 volts, ignitor circuit 200 requires 96 turns on secondary winding 224 and 13 turns on primary winding 222 (which gives a secondary-to-primary turns ratio of about 7.4). Unfortunately, a high turns ratio is also accompanied by a high leakage inductance for transformer 220, which tends to aggravate the previously noted negative impact upon the relative amplitudes of the positive and negative peaks of $V_{IGN}$.

What is needed therefore, is an HID lamp ignitor circuit that provides an ignition voltage having a reliable magnitude that is less affected by parasitic components. A need also exists for an ignitor circuit that is capable of being realized in a more cost-effective manner than comparable prior art approaches. Such an ignitor circuit would represent a considerable advance over the prior art.

DETAILED DESCRIPTION OF THE PREFERRED EMBODIMENTS

Figure 3:
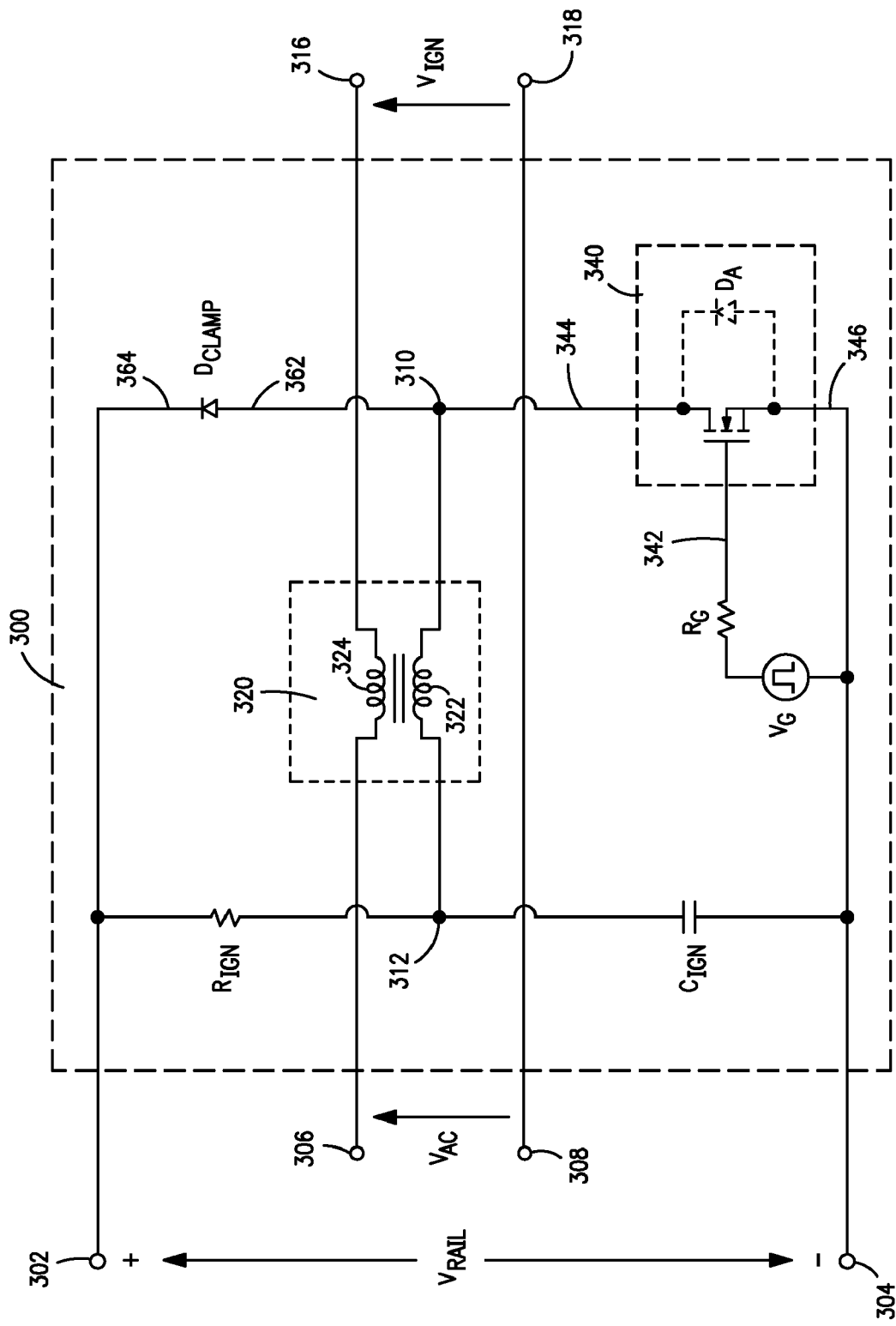
FIG. 3 describes an ignitor circuit, in accordance with a preferred embodiment of the present invention.

FIG. 3 describes a circuit 300 for igniting a high intensity discharge (HID) lamp. Circuit 300 comprises first and second DC input terminals 302,304, first and second AC input terminals 306,308, first and second output terminals 316,318, a charging circuit $R_{IGN}, C_{IGN}$, a transformer 320, a metal-oxide semiconductor field-effect transistor (MOSFET) 340, and a clamping diode $D_{CLAMP}$.

First and second DC input terminals 302,304 are intended to be connected to a substantially direct current (DC) rail voltage, $V_{RAIL}$, such as that which is typically provided by a suitable AC-to-DC converter (e.g., a combination of a full-wave rectifier and a boost converter) in a front-end portion of an electronic ballast; typically, $V_{RAIL}$ is selected to be on the order of several hundred volts (e.g., 460 volts). First and second AC input terminals 306,308 are intended to be connected to an alternating output voltage, $V_{AC}$, provided by a suitable DC-to-AC inverter (which functions to provide power to the HID lamp during steady-state operation). First and second output terminals 316,318 are intended to be connected to an HID lamp. Charging circuit $R_{IGN}, C_{IGN}$ is coupled between first and second DC input terminals 302, 304. Transformer 320 includes a primary winding 322 and a second winding 324. Primary winding 322 is coupled between a first node 310 and a charging circuit $R_{IGN}, C_{IGN}$ (at a second node 312). Secondary winding 324 is coupled between first AC input terminal 306 and first output terminal 316. MOSFET 340 is coupled between first node 310 and second DC input terminal 304. Clamping diode $D_{CLAMP}$ is coupled between first node 310 and first DC input terminal 302. During operation, circuit 300 provides a high voltage, $V_{IGN}$, between output terminals 316,318 for igniting an HID lamp.

MOSFET 340 is preferably implemented by a N-channel device having a gate terminal 342, a drain terminal 344, and a source terminal 346. Drain terminal 344 is coupled to first node 310. Source terminal 346 is coupled to second DC input terminal 304. Gate terminal 342 is coupled (via a resistor $R_G$) to a suitable control voltage, $V_G$, for activating (i.e., turning on) and deactivating (i.e., turning off) MOSFET 340.

The control voltage, $V_G$, can be provided by any of a number of suitable arrangements that are well known to those skilled in the art. However, the following points are relevant for purposes of practicing, and achieving the advantages of, the present invention. $V_G$ is configured to activate MOSFET 340 for a predetermined on-time period, and to deactivate MOSFET 340 for a predetermined off-time period. Additionally, and importantly for purposes of achieving the advantages of the present invention, $V_G$ is configured such that MOSFET is deactivated (i.e., turned off after having been turned on) while a substantial positive current (i.e., from, drain 344 to source 346) is still flowing through MOSFET 340; as will be discussed further below, this allows ignitor circuit 300 to achieve a useful voltage boost following deactivation of MOSFET 340. The pulse duration of $V_G$ is preferably selected so that MOSFET 340 is deactivated (i.e., turned off after having been turned on) when the current through MOSFET 340 (i.e., the current that flows from drain 344 to source 346 when MOSFET 340 is on) is at or near its peak value; in that way, maximum voltage boost (as manifested in the voltage across secondary winding 324) can be achieved. Nevertheless, it should be appreciated that the pulse duration of $V_G$ can be adjusted such that any desired ignition voltage (at secondary winding 324) can be provided. The pulse repetition rate for $V_G$ is preferably set in the range of several kilohertz to about 10 kilohertz; for example, in a prototype ignitor circuit configured substantially as described in FIG. 3 and designed for properly igniting a 100 watt MH M98 type lamp, the pulse repetition rate was set at about 3 kilohertz.

Figure 1:
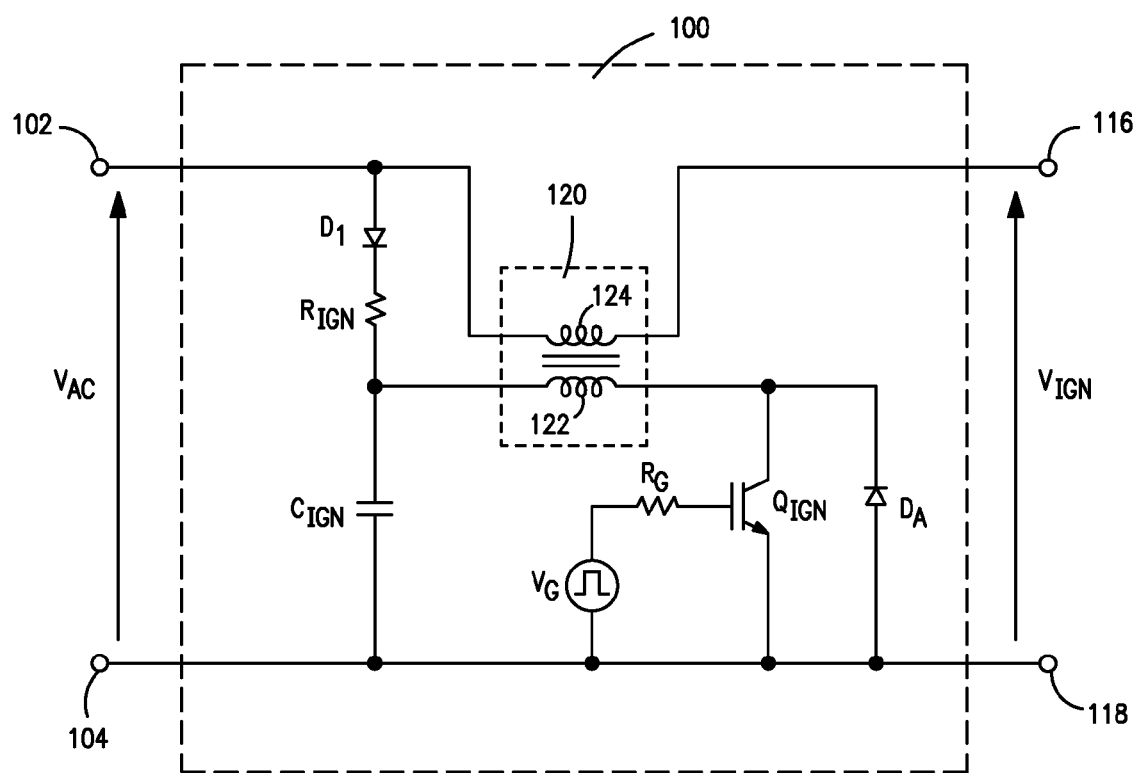
FIG. 1 describes a first example of an ignitor circuit, in accordance with the prior art.
Figure 2:
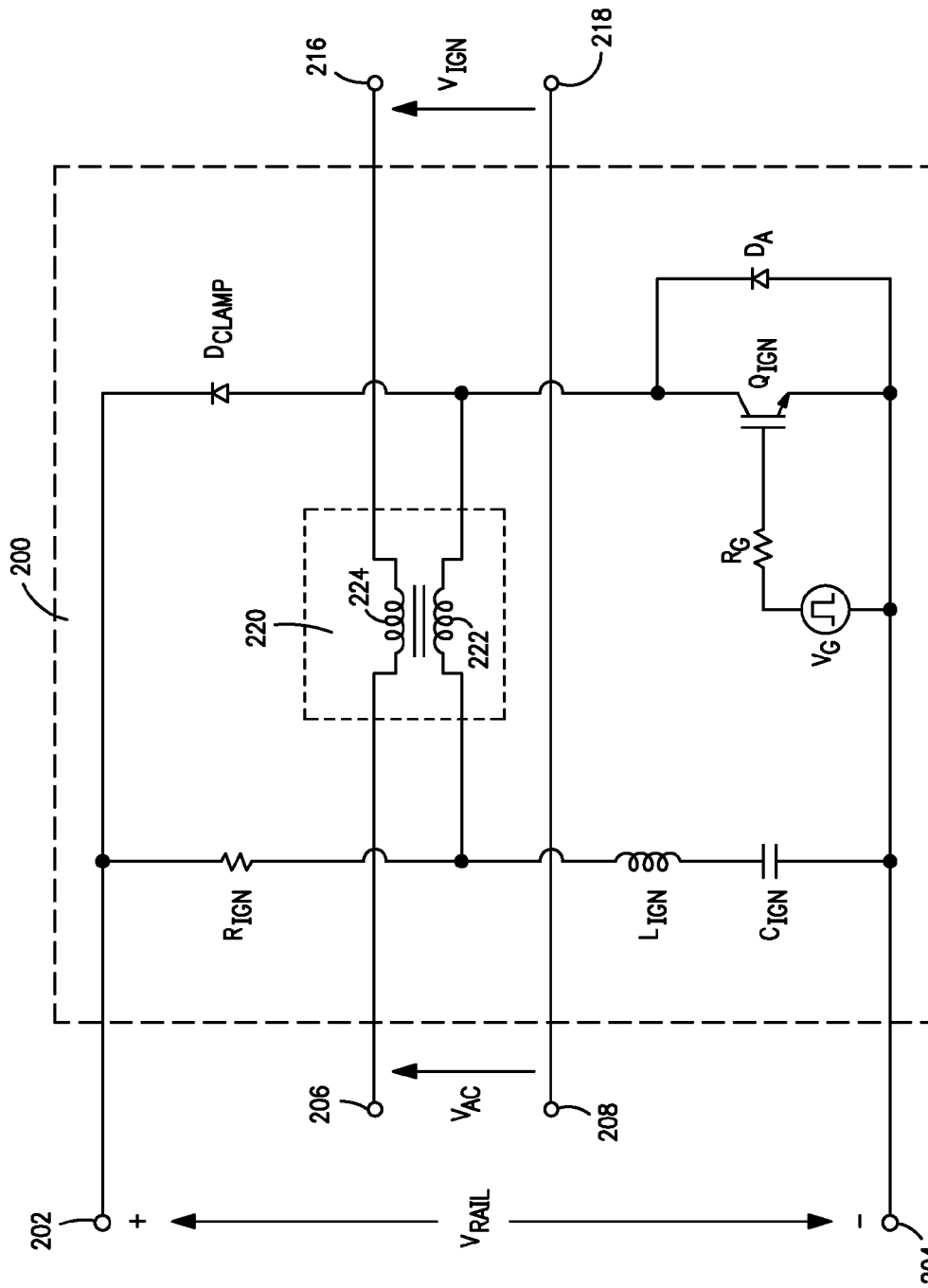
FIG. 2 describes a second example of an ignitor circuit, in accordance with the prior art.

Advantageously, ignitor circuit 300 does not require a separate anti-parallel diode (i.e., $D_A$ in the prior art circuits of FIGS. 1 and 2) to be connected in parallel with MOSFET 340. It will be understood by those skilled in the art that MOSFET 340 inherently includes an internal body diode (i.e., a diode $D_A$ with an anode connected to source terminal 346 and a cathode connected to drain terminal 344), as depicted by phantom lines in FIG. 3. It should be appreciated that, in ignitor circuit 300, the current that flows through body diode $D_A$ is substantially lower than the current that flows through anti-parallel diode $D_A$ in the prior art circuits described in FIGS. 1 and 2. As a consequence of this lower current, body diode $D_A$ of MOSFET 340 serves the same function (i.e., providing a circuit path for negative-going current) as anti-parallel diode $D_A$ in the prior art circuits depicted in FIGS. 1 and 2.

As illustrated in FIG. 3, clamping diode $D_{CLAMP}$ has an anode 362 and a cathode 364. Anode 362 is coupled to first node 310, and cathode 364 is coupled to first DC input terminal 302. During operation of ignitor circuit 300, clamping diode $D_{CLAMP}$ provides a positive current path (for the current that flows out of $C_{IGN}$ and through primary winding 322) when MOSFET 340 is turned off, thereby protecting MOSFET 340 and providing for periodic demagnetization of transformer 320.

Charging circuit $R_{IGN}, C_{IGN}$ includes a resistance $R_{IGN}$ and a capacitance $C_{IGN}$. Resistance $R_{IGN}$ is coupled between first DC input terminal 302 and a second node 312. Capacitance $C_{IGN}$ is coupled between second node 312 and second DC input terminal 304. During operation of ignitor circuit 300, resistance $R_{IGN}$ and capacitance $C_{IGN}$ function as an energy storage circuit. More particularly, $C_{IGN}$ charges up from $V_{RAIL}$ via $R_{IGN}$. When MOSFET 340 is turned on, the stored energy in $C_{IGN}$ energizes transformer 320; that is, when MOSFET 340 is turned on, current flows out of $C_{IGN}$, through primary winding 322, and through MOSFET 340.

Referring again to FIG. 3, primary winding 322 of transformer 320 is coupled between first node 310 and second node 312; as previously recited, secondary winding 324 is coupled between first AC input terminal 306 and first output terminal 316. During operation of ignitor circuit 300, the current that flows through primary winding 322 (after MOSFET 340 is activated) induces a voltage in primary winding 322 that, in turn, induces a corresponding voltage in secondary winding 320. MOSFET 340 is deactivated (i.e., turned off) while a positive current (preferably at or near its peak value) is flowing through primary winding 322 and MOSFET 340 (i.e., into drain terminal 344 and out of source terminal 346); this is in contrast with the operation of the circuits of FIGS. 1 and 2, in which $Q_{IGN}$ is not turned off until the corresponding current has reached zero. Significantly, in ignitor circuit 300, once MOSFET 340 is turned off, the current through primary winding 322 flows to DC input terminals 302,304 and $C_{IGN}$ via clamping diode $D_{CLAMP}$, which begins to conduct once MOSFET 340 turns off. In this critical period (sometimes referred to as a "clamping" period), the voltage across $C_{IGN}$ swings to a substantial high negative (with an amplitude that is further supplemented by $V_{RAIL}$); consequently, a large voltage boost is achieved across primary winding 322. This large voltage boost is manifested in the voltage across secondary winding 324 and, correspondingly, in $V_{IGN}$. The magnitude of this voltage boost is maximized when MOSFET 340 is deactivated (i.e., turned off) while the current flowing through MOSFET 340 is at its peak value. In this way, ignitor circuit 300 provides a suitably high voltage for reliably and properly igniting an HID lamp.

It should be appreciated that the aforementioned voltage boost does not occur in the prior art ignitor circuits 100,200 (see FIGS. 1 and 2) because each of those circuits employs an IGBT. In ignitor circuits 100,200, positive current continues to flow through the IGBT (this portion of the current cycle is commonly referred to as "tail current," and is attributable to minority carrier device characteristics) for a finite, but significant, period of time after the control voltage, $V_G$, has been removed. Accordingly, circuits 100,200 generally require a higher turns ratio for transformers 120,220 in order to provide a sufficiently high peak magnitude for $V_{IGN}$.

The magnitude of the voltage that develops across secondary winding 324 (and that ultimately determines the magnitude of the ignition voltage $V_{IGN}$) is dependent upon a number of factors, such as the magnitude of $V_{RAIL}$ (which, for purposes of the present invention, is considered to be predetermined) and the number of wire turns on secondary winding 324 relative to the number of wire turns on primary winding 322; other relevant factors include the pulse duration of $V_G$ (which determines the ON time of MOSFET 340) and the quality of magnetic coupling between primary winding 322 and secondary winding 324.

With further regard to transformer 320, primary winding 322 has a first number of wire turns, and secondary winding 324 has a second number of wire turns. In a preferred embodiment, when $V_{RAIL}$ is on the order of about 460 volts, the turns ratio (defined as the ratio of the second number of wire turns to the first number of wire turns) is selected to be on the order of about 4, but substantially less than about 7. More specifically, in a prototype circuit configured substantially as shown in FIG. 3, transformer 320 was designed with 23 turns on primary winding 322 and 96 turns on secondary winding 324 (which gives a turns ratio of 96/23=4.17). With this preferred turns ratio, ignitor circuit 300 provides an ignition voltage $V_{IGN}$ having a peak value that is on the order of about 3700 volts. In comparison, in order to provide a comparably high peak value for $V_{IGN}$, the prior art ignitor circuit 200 described in FIG. 2 requires (for $V_{RAIL}$=460 volts) 13 turns on primary winding 222 when there are 96 turns on secondary winding 224 (which gives a turns ratio of 96/13=7.38). Ignitor circuit 300 is thus capable of producing a sufficiently high ignition voltage, while at the same time allowing transformer 320 to be realized with a substantially lower turns ratio than what is required in the prior art ignitor circuits 100,200 described in FIGS. 1 and 2.

A lower turns ratio for transformer 320 provides several important benefits. First, a lower turns ratio means that transformer 320 has a correspondingly lower leakage inductance. It is expected that a lower leakage inductance is accompanied by less variation in the peak value of $V_{IGN}$ (i.e., as compared with what has been observed to occur in the circuits of FIGS. 1 and 2). More particularly, for ignitor circuit 300, it has been observed that the amplitude of the negative peak of $V_{IGN}$ is always much higher than the amplitude of the positive peak of $V_{IGN}$, which suggests that $V_{IGN}$ is less affected by parasitic components (such as the leakage inductance of transformer 320). A second important benefit stems from the fact that a lower required turns ratio means that primary winding 322 can be realized with a substantially higher number of turns (e.g., 23 versus 13) for a given number of turns (e.g., 96) on secondary winding 324. A higher number of turns on primary winding 322 provides (for a given core structure) a substantially higher inductance for primary winding 322. As a favorable consequence of the increased inductance of primary winding 322, ignitor circuit 300 does not require the presence of a separate inductor (i.e., $L_{IGN}$ in the circuit of FIG. 2) in the charging circuit; that is, the increased inductance of primary winding 322 effectively allows $L_{IGN}$ to be "integrated into" transformer 320, thereby enhancing the cost-effectiveness of ignitor circuit 300 over comparable prior art approaches.

Regarding the physical construction of transformer 320, it should be appreciated that while the maximum gauge of the wire that may be used for realizing for secondary winding 324 is necessarily constrained by the peak current (e.g., 1 ampere or more) that flows through the lamp during steady-state operation (i.e., after the lamp has ignited), the gauge of the wire that may be used for realizing primary winding 322 is essentially dictated by the root-mean-square (RMS) current that flows through primary winding 322 during the time when ignition pulses are generated. Thus, a relatively large gauge (i.e., small diameter) wire may be used for realizing primary winding 322. Additionally, there is no significant penalty (in core size) for the increased number of turns (i.e., 23 turns, as compared with 13 turns for the prior art circuit described in FIG. 2) on primary winding 322.

Although the present invention has been described with reference to certain preferred embodiments, numerous modifications and variations can be made by those skilled in the art without departing from the novel spirit and scope of this invention.

What is claimed is:

1. A circuit for igniting a high intensity discharge lamp, the circuit comprising:
   first and second DC input terminals adapted for coupling to a substantially direct current (DC) rail voltage;
   first and second AC input terminals adapted for coupling to an alternating output voltage of a DC-to-AC inverter;
   first and second output terminals that provide a lamp ignition voltage and that are adapted for coupling to a high intensity discharge (HID) lamp, wherein the second output terminal is coupled to the second AC input terminal;
   a charging circuit coupled between the first and second DC input terminals;
   a transformer comprising a primary winding and a secondary winding, wherein the primary winding is coupled between the charging circuit and a first node, and the secondary winding is coupled between the first AC input terminal and the first output terminal;

a metal-oxide semiconductor field-effect transistor (MOSFET) coupled between the first node and the second DC input terminal;
a clamping diode coupled between the first node and the first DC input terminal; and
wherein the circuit is operable to provide a voltage boost to the lamp ignition voltage upon deactivation of the MOSFET while current is still flowing in the MOSFET and wherein the lamp ignition voltage has a positive peak that is not significantly reduced by parasitic characteristics of the circuit.

2. The circuit of claim 1, wherein the MOSFET is an N-channel MOSFET having:
a gate terminal coupled to a control voltage;
a drain terminal coupled to the first node; and
a source terminal coupled to the second DC input terminal.

3. The circuit of claim 2, wherein the control voltage is operable to:
(i) activate the MOSFET for a predetermined on-time period; and
(ii) deactivate the MOSFET for a predetermined off-time period, wherein the MOSFET is deactivated while a substantial positive current is still flowing through the MOSFET.

4. The circuit of claim 3, wherein the control voltage is further operable to deactivate the MOSFET while the current flowing through the MOSFET is at or near its maximum instantaneous value.

5. The circuit of claim 1, wherein the clamping diode has an anode coupled to the first node, and a cathode coupled to the first DC input terminal.

6. The circuit of claim 1, wherein the charging circuit comprises:
a resistance coupled between the first DC input terminal and a second node; and
a capacitance coupled between the second node and the second DC input terminal.

7. The circuit of claim 6, wherein the primary winding of the transformer is coupled between the first node and the second node.

8. The circuit of claim 1, wherein:
the primary winding of the transformer has a first number of wire turns;
the secondary winding of the transformer has a second number of wire turns; and
a ratio of the second number of wire turns to the first number of wire turns is on the order of about 4.

9. The circuit of claim 8, wherein the ratio of the second number of wire turns to the first number of wire turns is substantially less than about 7.

10. A circuit for igniting a high intensity discharge lamp, the circuit comprising:
first and second DC input terminals adapted for connection to a substantially direct current (DC) rail voltage;
first and second AC input terminals adapted for coupling to an alternating output voltage of a DC-to-AC inverter;
first and second output terminals that provide a lamp ignition voltage and that are adapted for connection to a high intensity discharge (HID) lamp, wherein the second output terminal is coupled to the second AC input terminal;
a metal-oxide semiconductor field-effect transistor (MOSFET) coupled between a first node and the second DC input terminal;
a resistance coupled between the first DC input terminal and a second node (312);
a capacitance coupled between the second node and the second DC input terminal;
a transformer comprising:
a primary winding coupled between the first node and the second node; and
a secondary winding coupled between the first AC input terminal and the first output terminal;
a clamping diode having an anode coupled to the first node and a cathode coupled to the first DC input terminal; and
wherein the circuit is operable to provide a voltage boost to the lamp ignition voltage upon deactivation of the MOSFET while current is still flowing in the MOSFET and wherein the lamp ignition voltage has a positive peak that is not significantly reduced by parasitic characteristics of the circuit.

11. The circuit of claim 10, wherein the MOSFET is an N-channel MOSFET having:
a gate terminal coupled to a control voltage;
a drain terminal coupled to the first node; and
a source terminal coupled to the second DC input terminal.

12. The circuit of claim 11, wherein the control voltage is operable to:
(i) activate the MOSFET for a predetermined on-time period; and
(ii) deactivate the MOSFET for a predetermined off-time period, wherein the MOSFET is deactivated while a positive current is still flowing through the MOSFET.

13. The circuit of claim 12, wherein the control voltage is further operable to deactivate the MOSFET while the current flowing through the MOSFET is at or near its maximum instantaneous value.

14. The circuit of claim 10, wherein:
the primary winding of the transformer has a first number of wire turns;
the secondary winding of the transformer has a second number of wire turns; and
a ratio of the second number of wire turns to the first number of wire turns is on the order of about 4.

15. The circuit of claim 14, wherein the ratio of the second number of wire turns to the first number of wire turns is substantially less than about 7.

16. A circuit (300) for igniting a high intensity discharge lamp, the circuit comprising:
first and second DC input terminals (302,304) adapted for connection to a substantially direct current (DC) rail voltage ($V_{RAIL}$);
first and second AC input terminals (306,308) adapted for coupling to an alternating output voltage ($V_{AC}$) of a DC-to-AC inverter;
first and second output terminals (316,318) that provide a lamp ignition voltage and that are adapted for connection to a high intensity discharge (HID) lamp, wherein the second AC input terminal (308) is coupled to the second output terminal (318);
an N-channel metal-oxide semiconductor field-effect transistor (MOSFET) (340) having:
a gate terminal (342) coupled to a control voltage ($V_G$);
a drain terminal (344) coupled to a first node (310); and
a source terminal (346) coupled to the second DC input terminal (304);
a clamping diode ($D_{CLAMP}$) having coupled an anode (362) coupled to the first node (310) and a cathode (364) coupled to the first DC input terminal (302)
a resistance ($R_{IGN}$) coupled between the first DC input terminal (302) and a second node (312); and
a capacitance ($C_{IGN}$) coupled between the second node (312) and the second DC input terminal (304);
a transformer (320) comprising:

a primary winding (322) coupled between the first node (310) and the second node (312);

a secondary winding (324) coupled between the first AC input terminal (306) and the first output terminal (316); and wherein:

the primary winding (322) has a first number of wire turns;

the secondary winding (324) has a second number of wire turns; and a ratio of the second number of wire turns to the first number of wire turns is: (i) on the order of about 4; and (ii) substantially less than about 7; and wherein the circuit is operable to provide a voltage boost to the lamp ignition voltage upon deactivation of the MOSFET while current is still flowing in the MOSFET and wherein the lamp ignition voltage has a positive peak that is not significantly reduced by parasitic characteristics of the circuit.

17. The circuit of claim 16, wherein the control voltage ($V_G$) is operable to:

(i) activate the MOSFET for a predetermined on-time period; and (ii) deactivate the MOSFET for a predetermined off-time period, wherein the MOSFET is deactivated while a substantial positive current is still flowing through the MOSFET.

18. The circuit of claim 17, wherein the control voltage is further operable to deactivate the MOSFET while the current flowing through the MOSFET is at or near its maximum instantaneous value.

* * * * *